(12) United States Patent
Arango

(10) Patent No.: US 11,119,509 B2
(45) Date of Patent: Sep. 14, 2021

(54) CONFIGURING A COLOR BI-DIRECTIONAL PIXEL-BASED DISPLAY SCREEN WITH STEREO SOUND FOR LIGHT SHOWS USING QUADCOPTERS

(71) Applicant: Pedro Arango, Toronto (CA)

(72) Inventor: Pedro Arango, Toronto (CA)

(*) Notice: Subject to any disclaimer, the term of this patent is extended or adjusted under 35 U.S.C. 154(b) by 298 days.

(21) Appl. No.: 16/176,763

(22) Filed: Oct. 31, 2018

(65) Prior Publication Data

US 2019/0138031 A1    May 9, 2019

Related U.S. Application Data

(60) Provisional application No. 62/582,675, filed on Nov. 7, 2017.

(51) Int. Cl.

| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |

(Continued)

(52) U.S. Cl.
CPC ........... *G05D 1/104* (2013.01); *B64C 39/024* (2013.01); *G09F 19/18* (2013.01); *G09F 21/10* (2013.01); *B64C 2201/12* (2013.01); *B64C 2201/146* (2013.01)

(58) Field of Classification Search
CPC .......... B64C 2201/12; B64C 2201/146; B64C 39/024; B64C 2201/143; G06F 9/30101; G06F 9/45545; G06F 9/45558; G06F 2009/45579; H02J 7/0068; G04G 19/00; G04G 19/02; G04G 9/007; G05D 1/104; G09F 19/18; G09F 21/10; B64D 47/06
See application file for complete search history.

(56) References Cited

U.S. PATENT DOCUMENTS 9,973,261 B1 * 5/2018 Hardy ................ H04B 7/18523
2014/0233099 A1 * 8/2014 Stark ....................... G09F 21/14
  359/446

(Continued)

OTHER PUBLICATIONS

Intel's 500 Drone Light Show, YouTube online, published Nov. 4, 2016, https://www.youtube.com/watch? v=aOd4-T_p5fA, 1 page.

*Primary Examiner* — Abby Y Lin
*Assistant Examiner* — Sohana Tanju Khayer
(74) *Attorney, Agent, or Firm* — Sand, Sebolt & Wernow Co., LPA

(57) ABSTRACT

A system and method of displaying graphic information including a plurality of unmanned aerial vehicles that together form a display screen. Light elements are provided on each vehicle. A computer wirelessly connects to and controls the vehicles and is activated to deploy the vehicles and arrange them in a pattern in the air. The light elements become pixels on the display screen. The light elements may be on opposing regions of the unmanned aerial vehicles, thereby making it possible to view the display screen from more than one direction. Wireless signals are transmitted from the computer to the light elements. Light elements are selectively switched on and off in a manner that causes the light emitted therefrom to form textual or graphic images on one side and/or the other side of the display screen. When not in use, the vehicles are stored in a storage facility having charging stations.

26 Claims, 6 Drawing Sheets

(51) Int. Cl.
*G05D 1/10* (2006.01)
*G09F 19/18* (2006.01)
*B64C 39/02* (2006.01)
*G09F 21/10* (2006.01)

(56) References Cited

U.S. PATENT DOCUMENTS

| | | | |
|---|---|---|---|
| 2014/0236388 A1* | 8/2014 | Wong | G09G 5/02 |
| | | | 701/2 |
| 2017/0137125 A1* | 5/2017 | Kales | G09F 21/10 |
| 2017/0221394 A1* | 8/2017 | Garcia Morchon | G03B 21/608 |
| 2017/0225891 A1* | 8/2017 | Elazary | B65G 1/1375 |
| 2018/0136646 A1* | 5/2018 | Gurdan | G09F 21/06 |
| 2018/0231972 A1* | 8/2018 | Woon | G05D 1/0808 |
| 2019/0025822 A1* | 1/2019 | Sentosa | G08B 13/19602 |
| 2019/0033607 A1* | 1/2019 | Hein | G02B 27/149 |
| 2019/0100306 A1* | 4/2019 | Pohl | B64D 31/06 |

\* cited by examiner

CONFIGURING A COLOR BI-DIRECTIONAL PIXEL-BASED DISPLAY SCREEN WITH STEREO SOUND FOR LIGHT SHOWS USING QUADCOPTERS

CROSS-REFERENCE TO RELATED APPLICATIONS

This application claims the benefit of U.S. Provisional Patent Application Ser. No. 62/582,675, filed Nov. 7, 2017, the disclosure of which is incorporated herein by reference.

TECHNICAL FIELD

This invention is generally directed to display screens. More particularly, the present invention is directed to a system and method for displaying visual information, entertainment content, or advertisements on a display screen. Specifically, the present invention is directed to a system and method for simultaneously displaying content on two sides of a screen such that the content may be simultaneously viewed by audiences located on opposite sides of the display screen. The screen is comprised of a plurality of unmanned aerial vehicles that hover in the air in any configuration relative to each other, such as in a grid-pattern; and wherein one or more of the unmanned aerial vehicles includes one or more light elements thereon and each light element acts as a pixel on the display screen. A computer controls the activation and deactivation of the light elements and therefore controls the content that is displayed on the display screen.

BACKGROUND INFORMATION

It is common for content such as text, advertising, and visual images of other types to be displayed on screens. Some of the screens may be comprised of fabric-type materials that are permanently installed in a location. A projector shines a light on the fabric-like material to display desired content.

Other screens may be electronic in nature, such as light emitting diode (LED) banner displays. In these electronic screens, which are physical screens that are mounted to a support structure such as a building, the content is entered into a computer program which then relays the content to the LED banner display. The content displayed on these screens may include scrolled text or images.

In each of the above-mentioned instances, the screen has only one surface upon which text, images, advertising, or other content may be displayed. If the screen is placed so that two sides of the screen may be seen, the content on one side of the screen is reversed and may therefore interfere with the image on the opposite side of the screen. This makes the image on both sides of the screen difficult to see properly or understand.

There is a current trend of producing light shows in the air using drones. In these currently known light shows a number of drones are used, with each drone including a light source of some type. The drones are individually programmed to fly a particular flight path during the performance of the show. The flight paths of all of the drones is choreographed in such a way that, together, their lights will form an image in the air. If the drones are going to be used to form a first image and then a different second image, each drone has to be moved from a first position in the air where it formed part of the first image, to a second position in the air in order to become a part of the second image. The maneuvering of the various drones in the air is a complex operation. It also takes a days or weeks for specially designed computer programs to calculate how many drones to use and to plan how to move the drones from one position to another without interfering with each other. Consequently, if an advertiser, for example, wishes to use this technology, they have to give several days to a week or two's advance notice to a company that specializes in putting on these light shows so that the required specialized programming can be undertaken.

One other problem with this type of light show is that it takes time to fly each drone to a new location in the air to form part of a new image. There is therefore a delay between image formations and the entire light show is slowed down by the required complex maneuvering of the drones. Consequently, the presently known technology is not suitable for displaying complex animation or moving text or real-life images. The present technology is more suitable for displaying a static logo or image in the air. Text may be "disassembled" and "reassembled" with a different message but that said, the exercise would not be close to the fluidity of scrolling text, nor would it be feasible to have the clear, sharp, and short transition times characteristic of fading-out-fading-in slides in audio visual presentations.

Generally with this presently known technology a decision has to be made to determine the numbers of drones needed to credibly represent an object, with every drone representing a specific piece of the image; there are no "idle" drones in this technique. The number of drones involved in a single show greatly depends on the expected flying complexities: displaying text or shapes meant to remain whole even while moving about (albeit slowly) can include up to five hundred drones. On the other hand enacting a moving animal is better when utilizing fewer drones. For example less than 40 drones may be used but the formed image is essentially a still shot of an animated animal running in really slow motion. It is also impossible to present graphic images, such as a cartoon character that can speak as the drones that form the character's mouth are incapable of flying back and forth with sufficient speed and precision to make it appear as though the image is speaking.

It is important to notice that fundamental to the nature of the presently known technology is that every drone continuously carries with it the visual representation of the same part of the graphic image that is being formed by the drones. Furthermore, the content of the show has a direct impact on the flight path of each drone used in the show. This means that developers of entertainment content must also blend in the design of the flying paths of each of the copters; in essence two completely separate skills. And though there is continuous development in software for this purpose, not surprisingly immediacy is simply not feasible.

Finally, since flying depends on content, for every new show each individual drone involved must be uploaded with a considerable amount of data representing a new graphic image and a unique and complex flight path. Large data means large onboard memory needs.

SUMMARY

There is therefore a need in the art for an improved way to deliver visual content. The system and method disclosed herein provides a display screen that is capable of simultaneously displaying textual and graphic images and messages on two sides of the screen and is therefore able to reach a wider audience.

A system and method of displaying graphic information including a plurality of unmanned aerial vehicles that together form a display screen is disclosed. Light elements are provided on one or more of the vehicles. A computer wirelessly connects to and controls the vehicles and is activated to deploy the vehicles and arrange them into a pattern in the air. Light elements on the vehicles become pixels on the display screen. Because the light elements are on opposing sides of the unmanned aerial vehicles, the pixels are located on both opposing sides of this display screen. Wireless signals are transmitted from the computer to the light elements. Light elements are selectively switched on and off in a manner that causes the light emitted therefrom to form textual or graphic images on one side and/or the other side of the display screen. When not in use, the vehicles are stored in a storage facility having charging stations.

In one aspect, the present disclosure may provide a system for displaying graphic content such as text or images, said system comprising a display screen; and a computer programmed to display graphic content on the display screen; and wherein the display screen comprises a plurality of unmanned aerial vehicles deployed and hovering in a pattern in the air; wherein one or more of the plurality of unmanned aerial vehicles includes at least one light element; and wherein the at least one light element forms a pixel on the display screen; and wherein the graphic content to be displayed is transmitted by the computer to the at least one light element of the one or more of the plurality of unmanned aerial vehicles. The pattern is a fixed pattern of the plurality of unmanned aerial vehicles and includes that the plurality of unmanned aerial vehicles are positioned at repetitive intervals from each other and the at least one light element on the plurality of unmanned aerial vehicles are uniformly scattered in the display screen. The pattern of the plurality of unmanned aerial vehicles forms a substantially flat display screen. The plurality of unmanned aerial vehicles are substantially motionless when arranged in the pattern and forming the display screen.

One or more of the plurality of unmanned aerial vehicles includes at least two light elements; and a first light element of the at least two light elements is provided on a first region of the one or more of the plurality of unmanned aerial vehicles and a second light element of the at least two light elements is provided on a second region of the one or more of the plurality of unmanned aerial vehicles; and wherein the first light elements form a first side of the display screen; and the second light elements form a second side of the display screen; and wherein the computer is programmed to provide a first graphic content and a second graphic content and the first graphic content is displayed on the first side of the display screen and the second graphic content is displayed on the second side of the display screen.

In another aspect, the present disclosure may provide a system for displaying graphic content in the air, said system comprising a display screen that is bidirectional; and a computer programmed to display graphic content on the display screen; wherein the display screen comprises a plurality of unmanned aerial vehicles deployed and hovering in a fixed pattern in the air; wherein each of the plurality of unmanned aerial vehicles includes at least one light element at one or both of two opposing regions of a body of the unmanned aerial vehicle; wherein the at least one light element forms a pixel on a first side or on a second side of the display screen; and wherein the computer selectively illuminates the at least one light element on the one or both of the first and second sides of the display screen and thereby displays graphic content on the one or both of the first side and the second side of the display screen.

In one embodiment, the plurality of unmanned aerial vehicles is a plurality of quadcopters. The at least one light element may further comprise a pair of light elements mounted on opposite sides of the quadcopter. Each of the pair of light elements is separately or individually illuminated by the computer; and wherein a first of the pair of light elements forms a pixel on a first side of the display screen; and wherein a second of the pair of light elements forms a second pixel on a second side of the display screen; and the display screen formed by the plurality of unmanned aerial vehicles is a bidirectional display screen having a first screen on the first side and a second screen on the second side. The first screen and the second screen on the bidirectional display screen are independent of each other. The system may further comprise one or more sensors located on the one or more of the plurality of unmanned aerial vehicles; wherein the one or more sensors is operatively engaged with the computer and provides information relating to a coordinate position of an associated one of the plurality of unmanned aerial vehicles. The system may also include a speaker or another type of audio visual equipment provided on the one or more of the plurality of unmanned aerial vehicles. The system may further comprise a storage facility including a plurality of cubicles, wherein each of the plurality of unmanned aerial vehicles is configured to be received inside one of the cubicles. More than one of the unmanned aerial vehicles may be received in a single cubicle.

In yet another aspect, the present disclosure may provide a method of displaying graphic information comprising deploying a plurality of unmanned aerial vehicles; arranging the deployed plurality of unmanned aerial vehicles into a grid pattern in the air, and wherein the grid pattern is substantially fixed in the air; keeping the plurality of unmanned aerial vehicles substantially motionless while in the grid pattern; wirelessly linking the plurality of unmanned aerial vehicles to a computer; wirelessly transmitting signals from the computer to the unmanned aerial vehicles; illuminating a light element on a first side of one or more of the plurality of unmanned aerial vehicles; and creating a graphic pattern on the grid pattern utilizing the illuminated light element of the one or more of the plurality of unmanned aerial vehicles. The method may further comprise configuring the grid pattern into a substantially flat display screen and orienting the grid pattern vertically in the air to create a vertically-oriented grid pattern.

In one embodiment the method may further comprise hovering all of the plurality of unmanned aerial vehicles in the vertically-oriented pattern in the air and in such a way that each unmanned aerial vehicle is substantially motionless (other than the rotating of the blades to keep the vehicle in the air). In other words, the plurality of unmanned aerial vehicles do not fly around in order to produce a graphic image; instead, the vehicles are moved into a fixed position within the desired pattern and then remain substantially stationary in that fixed position during the entire time the graphic is displayed.

The method may further comprise viewing the graphic pattern from the ground a distance away from a first side of the grid pattern. The method may further comprise illuminating a light element on a second side of one or more of the plurality of unmanned aerial vehicles; creating a second graphic pattern on a second side of the vertically-oriented grid pattern, wherein the second side is opposed to the first side; and viewing the second graphic pattern from the ground a distance away from the second side of the vertically oriented grid pattern. The method may further comprise simultaneously creating the graphic pattern and the second graphic pattern. The creating of the graphic pattern includes rolling text or images across the first side of the vertically oriented grid pattern; and the creating of the second graphic pattern includes rolling text or images across the second side of the vertically-oriented grid pattern; and wherein the rolling of text or images across the first side occurs in a direction opposite to the rolling of text or images across the second side.

The method may further comprise providing a sensor on the one or more of the plurality of unmanned aerial vehicles; and determining a position of the one or more of the plurality of unmanned aerial vehicles using data provided by the sensor. The method may further comprise providing an audio speaker on the one or more of the plurality of unmanned aerial vehicles; and playing an audio track utilizing the audio speaker on the one or more of the plurality of unmanned aerial vehicles.

The method may further comprise assigning a pixel position in the grid pattern for one or more of the plurality of unmanned aerial vehicles; wirelessly transmitting a signal from the computer to the one or more of the plurality of unmanned aerial vehicles; and moving the one or more of the plurality of unmanned aerial vehicles to the assigned pixel position in the grid pattern.

The method may further comprise deploying the plurality of unmanned aerial vehicles from a storage facility. The method may further comprise moving the plurality of unmanned aerial vehicles from the grid pattern to a storage facility; parking each of the one or more of the plurality of unmanned aerial vehicles in a cubicle within the storage facility. The method may further comprise charging each of the one or more of the plurality of unmanned aerial vehicles while parked in the cubicle in the storage facility. The method may further comprise assigning the cubicle for each of the one or more of the plurality of unmanned aerial vehicles; wirelessly transmitting a signal from the computer to each of the one or more of the plurality of unmanned aerial vehicles; and moving each of the one or more of the plurality of unmanned aerial vehicles to the assigned cubicle.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

Similar numbers refer to similar parts throughout the drawings.

DETAILED DESCRIPTION

Figure 1:
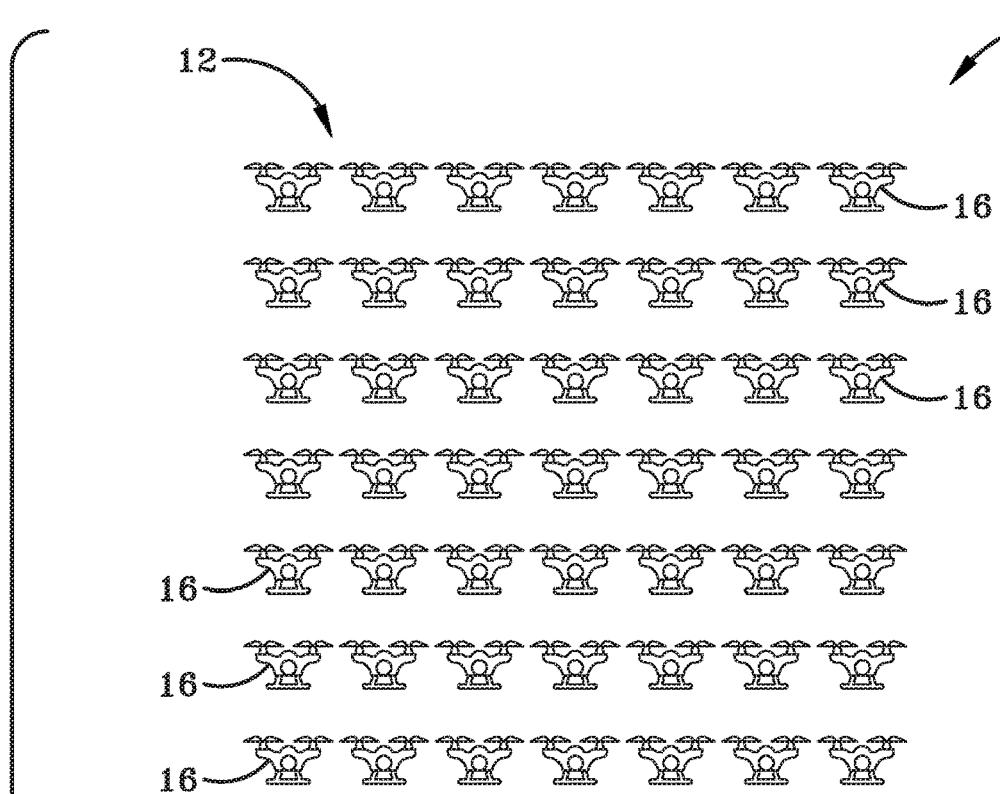
FIG. 1 is a diagrammatic view of a display system in accordance with the present disclosure.
Figure 1:
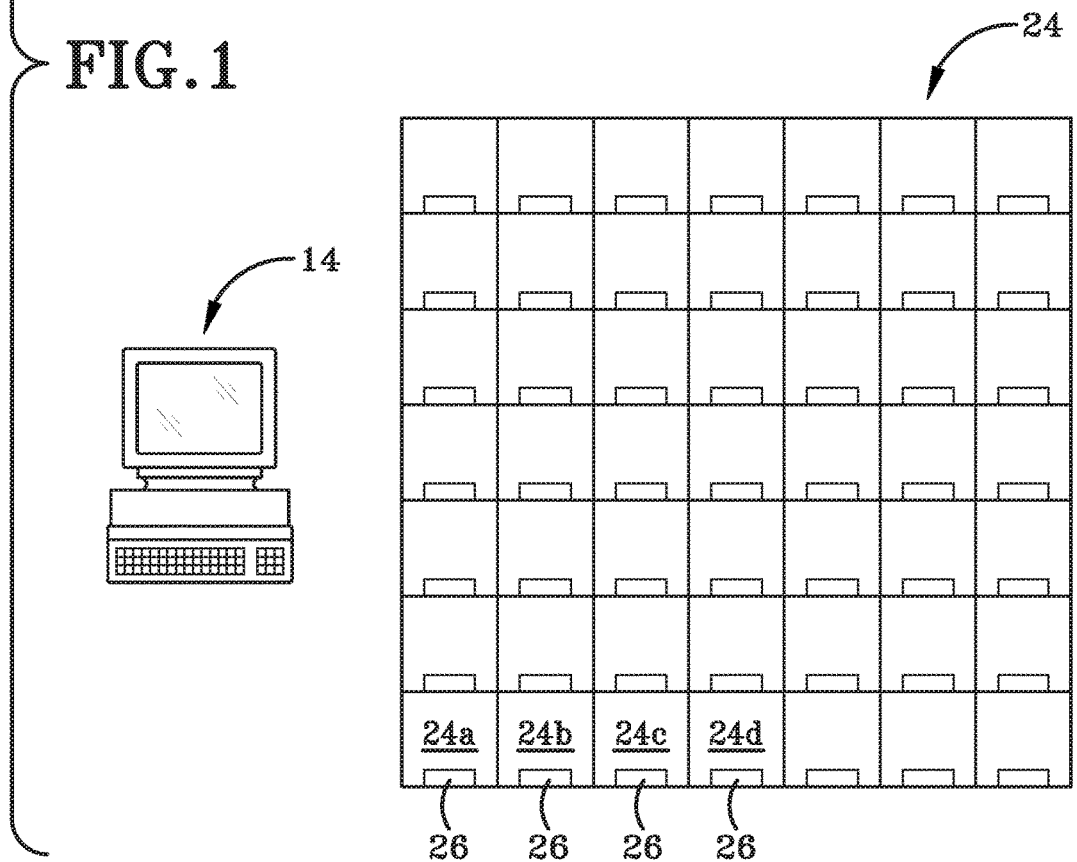
Figure 1A:
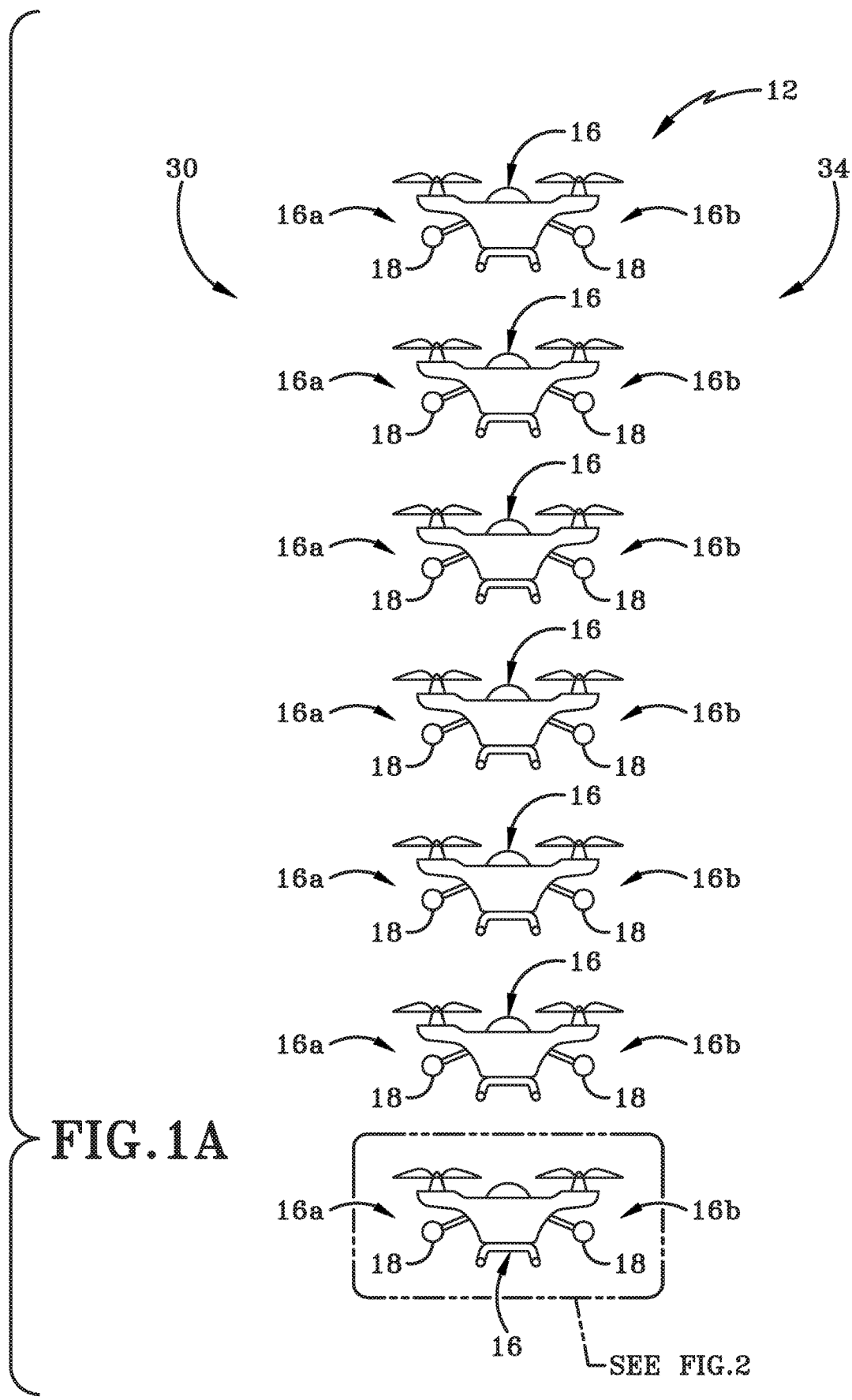
FIG. 1A is a side elevation view of the display screen shown in FIG. 1.

Referring to FIGS. 1-6, there is shown a display system in accordance with the present disclosure, generally indicated at 10. System 10 comprises a display screen 12, a computer 14, and a plurality of unmanned aerial vehicles 16 that are maneuvered by the computer 14 to form display screen 12 in the air as will be described later herein. Each unmanned aerial vehicle 16 may include one or more light sources 18, one or more sensors 20, a battery 21, and, in some instances an audio speaker 22. System 10 may also include a storage facility 24 comprised of a plurality of stacked cubicles 24a, 24b, 24c, 24d etc. and one or more battery charging stations 26 for charging the batteries 21 of unmanned aerial vehicles 16.

Unmanned aerial vehicles 16 may be autonomous drones, particularly, quadcopters 16. The term "autonomous drone" is used to describe a drone that may be programmed with coordinates for a position in the display screen and a flight plan to get there, for example, and then the drone operates substantially independently. A quadcopter is a drone that has four rotors or propellers. Two of the rotors rotate in a clockwise direction and the other two rotors rotate in a counterclockwise direction. The result is that the quadcopter is able to be rapidly moved vertically up or down, is easily maneuvered for straight flight in the air, can be kept to a relatively small size and typically is capable of hovering in a stable orientation. It will be understood, however, that any type of drone that may be readily controllable as a group or en masse is contemplated to be suitable for use in system 10 and to perform the method disclosed herein. The terms "unmanned aerial vehicle", "quadcopter" and "drone" may be used interchangeably herein and may be referenced by the same reference number 16. Additionally, these terms should also be understood to apply to any type of unmanned aerial vehicle 16 that is capable of performing the steps set out herein and should not be limited to quadcopters as described and illustrated herein as these are provided by way of example only.

As indicated above, unmanned aerial vehicles 16 may be arranged to form display screen 12 in the air for displaying visual content thereon, and computer 14 is specially programmed to control the movements of the plurality of unmanned aerial vehicles 16 and to upload and control the content displayed on display screen. 12. Content may include but is not limited to letters, numbers, words, graphic images, visual patterns etc. whether those images are static or moving. Computer 14 may also control audio feed to audio speakers 21 provided on unmanned aerial vehicles 16 or to any other speakers that may be located around an audience that is viewing display screen 12.

Each unmanned aerial vehicle 16 utilized in the system 10 will be equipped with one or more separate light elements 18. For example, in one embodiment each unmanned aerial vehicle may be provided with two separate light elements 18 with one of these light elements 18 located toward a first side 16a of the body of quadcopter 16 and the other of the light elements 18 located toward a second side 16b of the body. In other embodiments more than one light element 18 will be provided on each of the first side 16a and second side 16b of the quadcopter body and the light elements 18 may be oriented in such a way as to face away from each other and therefore be directed to emit light in opposite directions. Each unmanned aerial vehicle may therefore carry a minimum of one light element 18 facing forward. In other embodiments each unmanned aerial vehicle may also carry a minimum of one light element facing backwards. In yet other embodiments, each unmanned aerial vehicle may carry one a single light element 18 on a bottom surface of the vehicle's body. It should be understood that the light elements 18 may be placed anywhere that is suitable on the unmanned aerial vehicle and the terms "side", "region", 'bottom" etc. should not be interpreted as unnecessarily limiting the positioning of the light elements 18 on the unmanned aerial vehicles and should further not be interpreted as indicating the exactly location on the vehicle where the one or more light elements are positioned.

Figure 2:
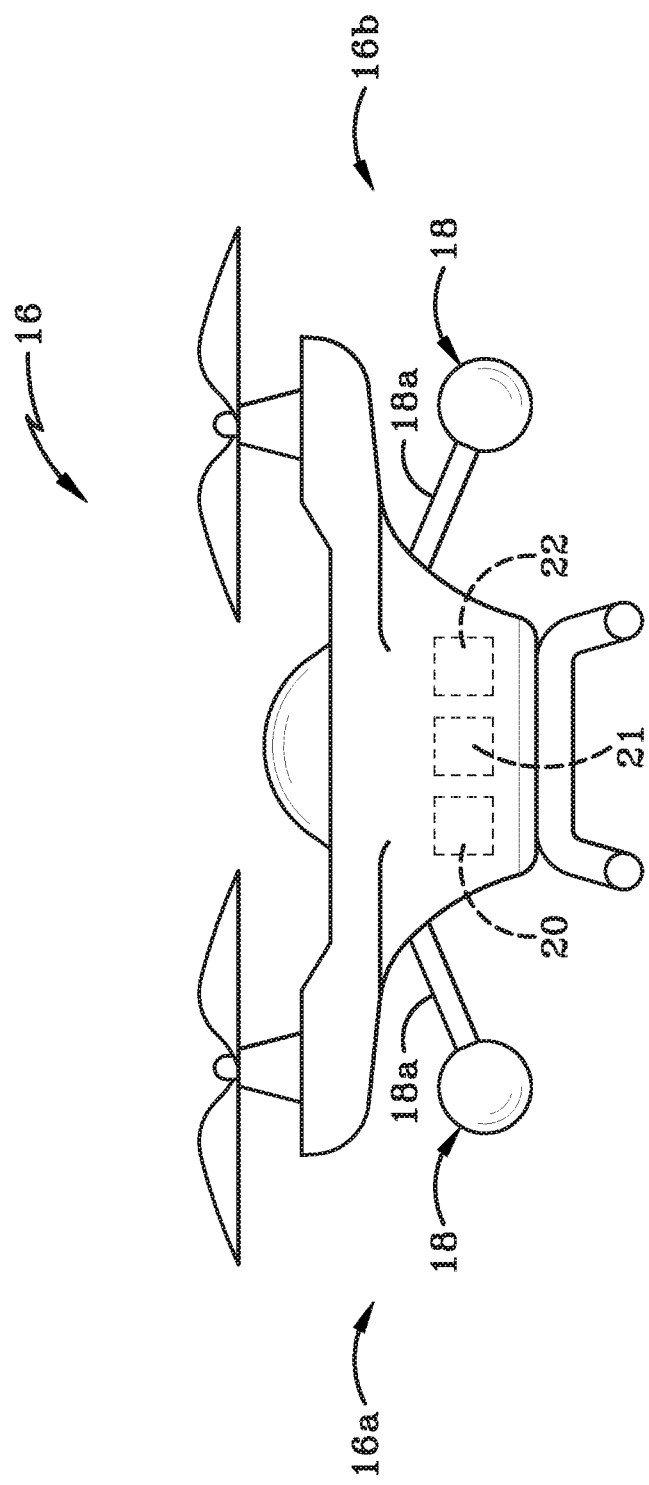
FIG. 2 is an enlargement of the highlighted region of FIG. 1.

Each unmanned aerial vehicle 16 may have one or more pixel pods 18a mounted thereon and extending outwardly therefrom. Each pod 18a may be oriented on the vehicle's body at an angle of about 45° off a vertical axis or a horizontal axis. It should be noted that the location and angle of pixel pods 18a as illustrated in FIG. 2 is by way of example only and one or more pixel pods 18a may be provided at any location and at orientation on the unmanned aerial vehicles 16. In some embodiments four pixel pods 18a may be utilized on each quadcopter 16 as utilizing such pixel pods 18a may increase the resolution of the display screen 12 five-fold. The onboard light elements 18 may coincide with the intersection of the pods 18a, all in all resembling an "X" with bi-directional pixels at the tips and at the center; thus producing five pixels per quadcopter 16 per screen 12. The pixel pods 18a may be extended when the display screen 12 is deployed and may be retracted when the unmanned aerial vehicles 16 are not deployed as a screen 12 and are in flight to or from storage facility 24 or located within storage facility 24.

The light elements 18 themselves may comprise components such as light emitting diodes (LEDs), end-emitting optical fibers, illuminators, or terminators. The light elements 18 may further be of any suitable type that may enable color graphic images and text to be displayed.

When display screen 12 is deployed, the unmanned aerial vehicles 16 may be formed into a fixed pattern in the air. This fixed pattern of unmanned aerial vehicles 16 forms a substantially flat display screen in the air. The flat display screen may be oriented generally vertically in the air. In other instances, however, it may be desirable to orient the flat display screen generally horizontally and generally parallel to the ground. The unmanned aerial vehicles 16 will hover in place while in the display screen 12. Each unmanned aerial vehicle is substantially motionless in the air (other than the rotating of the blades to keep the vehicle in the air). In other words, the plurality of unmanned aerial vehicles 16 do not fly around in order to produce a graphic image; instead, the vehicles 16 are moved into a fixed position within the desired pattern (i.e., display screen 12) and then the vehicles 16 remain substantially stationary in that fixed position during the entire time a graphic image is displayed on display screen 12.

In order to form the display screen 12, a pixel position in the grid pattern that comprises the display screen 12 is assigned to one of the plurality of unmanned aerial vehicles 16; a signal is wirelessly transmitted from the computer 14 to the one or more of the plurality of unmanned aerial vehicles; and the one or more of the plurality of unmanned aerial vehicles 16 moves (i.e., flies) to the assigned pixel position in the display screen. In this instance, the signal may comprise the coordinates in the display screen for the selected unmanned aerial vehicle 16. The pixel position may be associated with a specific unmanned aerial vehicle 16 in one example but may be associated with any of the unmanned aerial vehicles 16 in other examples. In other words, any one of the plurality of unmanned aerial vehicles 16 may be moved to a specific pixel position in the display screen 12. In other instances, a specific one of the plurality of unmanned aerial vehicles 16 may be moved to any one of a plurality of different pixel positions in display screen 12.

The unmanned aerial vehicles 16 may form the display screen 12 with a first side and, in some instances, with an opposed second side. The first side of the display screen 12 may, for instance, be formed by all of the light elements 18 of all the unmanned aerial vehicles 16 that face a forward direction. The second side of the display screen 12 may be formed by all the light elements 18 of all the unmanned aerial vehicles 16 that face a backward direction. Display screen 12 with its first side and second side forms a bidirectional display screen where the first side of display screen 12 forms a first screen for display of graphic content and where the second side of display screen 12 forms a second screen for display of graphic content. The bidirectional display screen 12 thus addresses opposing audiences (i.e., audiences located on the ground on either side of display screen 12). The content that may be displayed on the first screen and the second screen can be the same or it can be completely different. Each of the first screen and the second screen of display screen 12 may have around two thousand pixels per screen.

Figure 3:
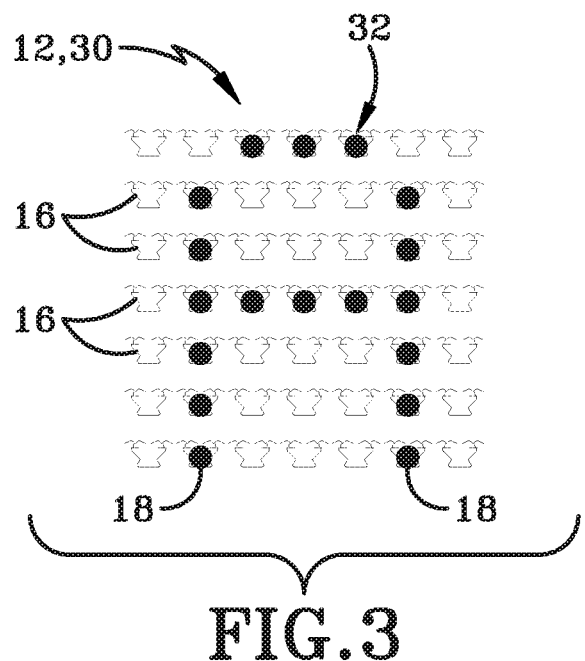
FIG. 3 is a first side of a display screen formed by a plurality of unmanned aerial vehicles arranged in a first pattern in the air and showing a first image thereon.
Figure 4:
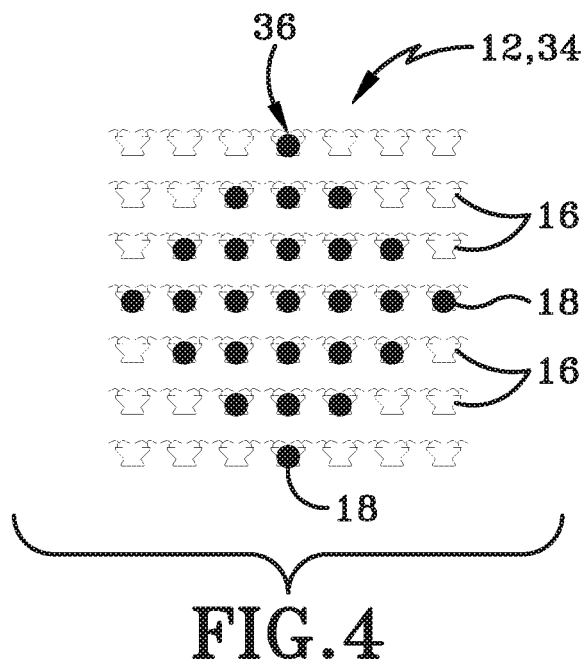
FIG. 4 is a second side of the display screen of FIG. 3 showing a second image thereon.

FIGS. 3 and 4 show that Images may be displayed on one or the other or both of a first screen 30 (FIG. 3) or a second screen 34 (FIG. 4) of the bidirectional screen 12. FIG. 3 shows by way of example only, the letter "A" as a textual image 32 displayed on first screen 30. FIG. 4 shows, by way of example only, a shape of a diamond is illustrated as a graphic image 36 on second screen 34. The letter "A" and the diamond shape are formed by illuminating only specific light elements 18 on one side of the body of each of a plurality of specific unmanned aerial vehicles 16 within the plurality of unmanned aerial vehicles 16. The other light elements on the same side of the bodies of the rest of the unmanned aerial vehicles 16 remain dark. Computer 14 may be programmed to move the image 32 or 36 in any desired direction by sequentially illuminating other light elements 18 on other unmanned aerial vehicles and deactivating the previously lit light elements 18 that made the original images 32 or 36.

Figure 5:
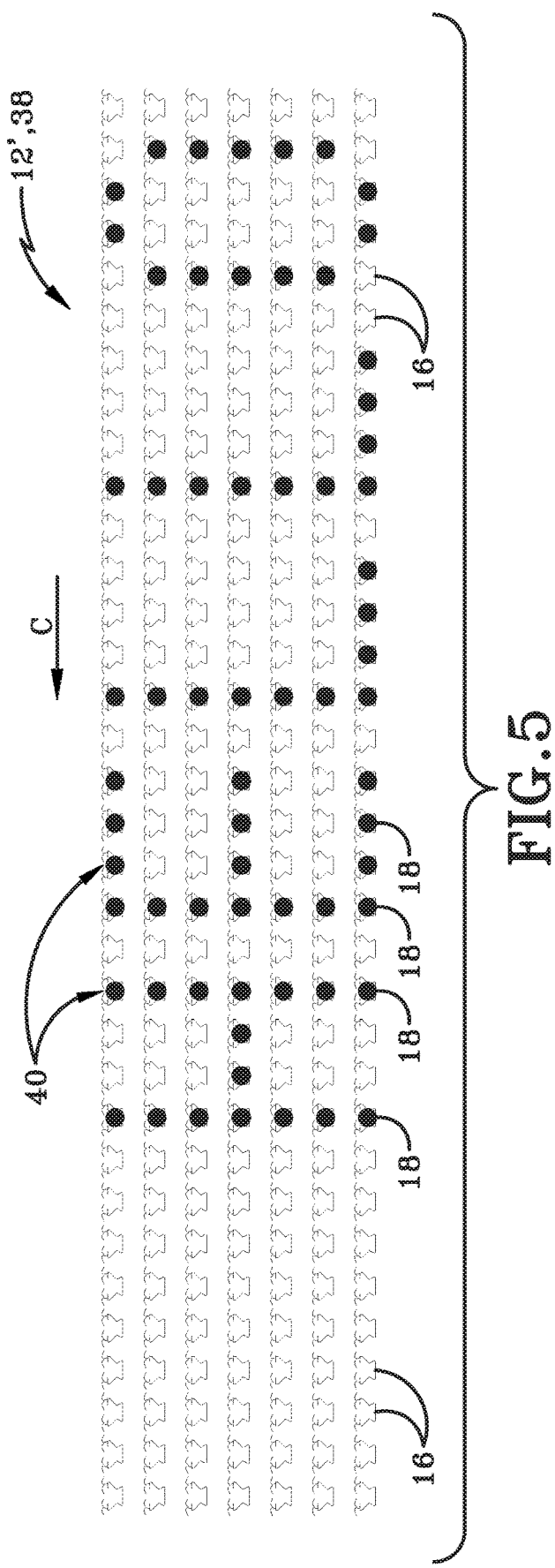
FIG. 5 is a first side of a display screen formed by a plurality of unmanned aerial vehicles arranged in a pattern that is different from the pattern shown in FIGS. 3 and 4.
Figure 6:
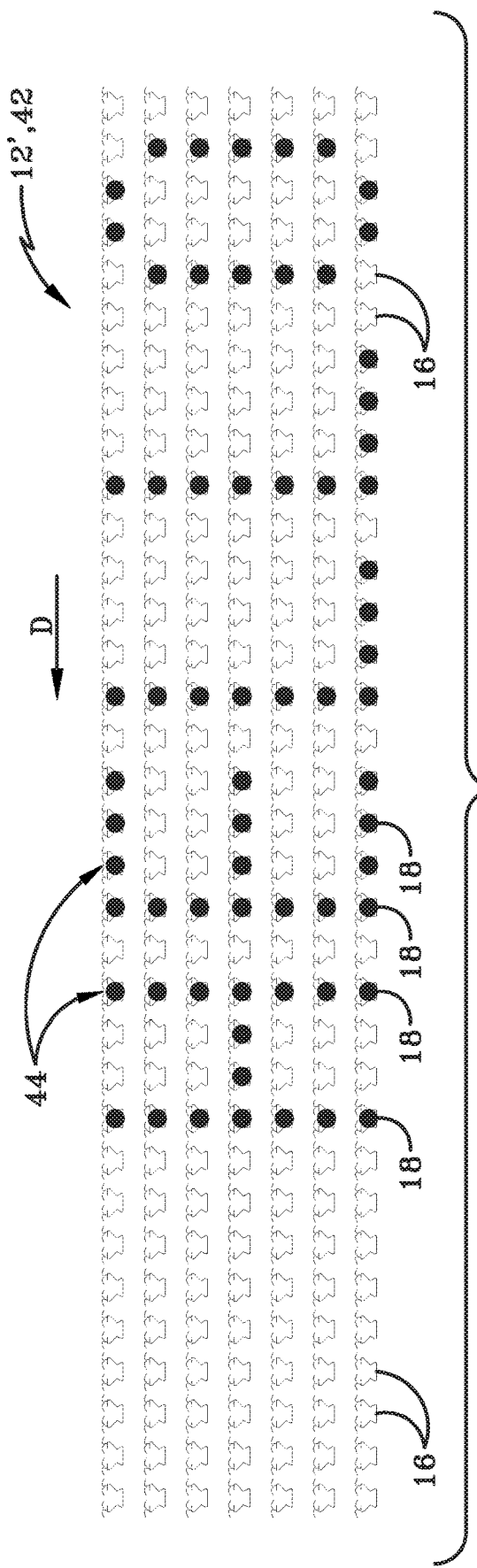
FIG. 6 is a second side of the display screen of FIG. 5.

FIGS. 3 and 4 show display screen 12 having a first configuration in the air. FIGS. 5 and 6 show display screen 12' in a second configuration. This is accomplished by computer 14 moving a plurality of unmanned aerial vehicles 16 into a new position so that the shape of the pattern is altered. In this particular instance, FIGS. 5 and 6 show the first and second screens of the display screen 12' that is longer than display screen 12. FIG. 5 shows a first screen 38 of bidirectional screen 12' with a word 40 scrolling thereacross in the direction of arrow "C". FIG. 6 shows a second screen 42 of bidirectional screen 12' with a textual image in the form of a word 44 scrolling thereacross in the direction of arrow "D". It should be noted that because first screen 38 and second screen 42 are opposed, arrows "C" and "D" are actually indicating opposite directions of the scrolling images, namely words 40, 44 thereon. Audiences watching first screen 38 and second screen 42 will therefore see the same word simultaneously and that word will effectively move across the screen in the same direction for each of the different audiences. Additionally, because the light elements 18 are directed away from each other, the image 40 on first screen 38 will not be visible to the audience watching second screen 42 and the image 44 on second screen 42 will not be visible to the audience watching first screen 38. It will be understood, that different words or graphic images may be displayed on first screen 38 relative to second screen 42 and that movements on those images may be in any direction as there is no interference between the displayed images on the two screens.

As discussed above, each light element 18 may comprise one pixel in the screen 12 or 12'. The screen 12, 12' formed by the vertically-oriented array of unmanned aerial vehicles 16 may therefore comprise a bidirectional display screen that is capable of showing content in a first direction to a first audience and showing the same or other content in an opposed second direction to a second audience. Because the light elements 18 on each unmanned aerial vehicle face a different direction, the content displayed on each side of the so-formed bidirectional screen 12 can be different and can be moving in opposite directions on each side. This is particularly helpful if the content being displayed is text. The bidirectional screen 12 formed by utilizing the unmanned aerial vehicles 16 therefore offers a bi-directional screen 12 that is capable of reaching double the size of current audiences.

The number of unmanned aerial vehicles 16 utilized in the present system will be dependent upon how large a screen 12 or 12' is to be formed thereby. It will be understood that because the screen 12 is formed by deploying the plurality of unmanned aerial vehicles 16 in any desired pattern, the shape and size of the bidirectional screen 12 formed by the unmanned aerial vehicles 16 can be readily and easily changed utilizing the computer 14 programmed to control the screen 12. It is contemplated that for a relatively large screen 12, as many as two thousand unmanned aerial vehicles 16 could be utilized to form the screen 12.

The computer 14 utilized to control the unmanned aerial vehicles 16 and control the display of content thereon may be any computer 14 that is specifically programmed to do so. The programming may control parking the plurality of unmanned aerial vehicles 16 in the specially designed stacked storage facility 24, sequentially moving the unmanned aerial vehicles 16 from their parking places, deploying the unmanned aerial vehicles 16 to form the screen 12 and controlling the content displayed by the unmanned aerial vehicles 16 on the two opposing sides of the screen 12. Ideally, deploying and retrieving the screen 12 should happen at the flick of switch, a turn-key operation controlled by one single computer 14 and completely unrelated to content. Very much like turning a flat screen on/off.

Two important factors to consider in the bidirectional screen 12 of the present disclosure are stability of hover of the plurality of unmanned aerial vehicles 16 and screen resolution of the screens 12 provided by the vehicles 16. The ability for the quadcopters 16 to hover in a stable pattern to provide the best screen resolution may be obtained by utilizing sensor data (provided by the one or more sensors 20) applicable at each representative (x, y) pixel position on a grid formation such as, for example, a corner or border, or any other position within the grid formation. The hover control may be modular, uniform and repeatable, and completely independent of graphic content to be displayed on screen 12. Any overhead effort per distinct show is radically diminished because flight developing is replaced with executing a hovering scheme already developed tested and used previously. It may also be possible to incorporate some type of location software in system 10 by inch-precision enhanced GPS such as RTK (Real Time Kinetics) or any other suitable or desired software.

In the past, pixels have typically been affixed to substrates or some type of chassis thus inherently all forming part of one same device or apparatus. Providing the pixels on quadcopters 16 gives unexpected advantages because quadcopters 16 are inherently free. In the bidirectional screen 12, the plurality of quadcopters 16 hovers in any suitable or desired configuration or pattern. The desired configuration may take the form of a pattern but it will be understood that the pattern may be utilized in a variety of different shapes that may be of a regular pattern such as a square or rectangle but the configuration could also take other forms if desired, such as a circle. Very conveniently, that same ability to fly free allows the bidirectional screen 12 the versatility to easily deploy in different display configurations, from long narrow banners mostly suited for scrolling text, to more conventional screen 12 aspects, both in bi-directional mode. Two thousand quadcopters 16 may provide between two and ten thousand pixels on each of the bi-directional screen 12. This provides enough resolution, given the intended audience and content, to provide full color cartoon-type graphics and animations along with full-scroll text capabilities.

If two thousand quadcopters 16 are utilized in system 10, then storing two thousand Quadcopters 16 in-site would be convenient where daily shows are planned, such as in an amusement park or a large concert venue or sporting event, for example. A layout of a "garage" or storage facility 24 for the quadcopters 16 could resemble a free range chicken farm coop divided in eleven parallel halls, each comprising of rows of nesting boxes (cubicles (24a, 24b, 24c, 24d)) stacked three high, each row with sixty-one cubicles (24a, 24b, 24c, 24d). This arrangement would allow for two thousand and thirteen quadcopters 16 to be stored in the storage facility 24 namely, two thousand operative quadcopters 16, and thirteen spare quadcopters 16. This storage volume would probably fit well within a space about the size of an Olympic swimming pool, and like a pool, the storage facility 24 could be placed underground or partially underground and may be accessed through a single opening defined in the ground.

The quadcopters 16 would remain in their cubicles (24a, 24b, 24c, and 24d) within the storage facility 24 between missions. A cubicle's location within the storage facility 24 may be defined by a row (e.g. 0-60), a stack (e.g. 1-3), and a hall (e.g. 1-11) numbers -SRH. Each single hall may comprise three stacked rows and a corridor. On their way out of the storage facility 24, each quadcopter 16 will leave its cubicle 24a, for example, traverse corridors in storage facility 24, and emerge topside through an opening or openings defined in the ground. All flight paths and sequences involved with respect to the quadcopters 16 would be repeatable, modular, and uniform in nature and could involve mostly single-file flying.

On its way out of the storage facility 24, each quadcopter 16 may be identified using Near Field Communication (NFC) sensors. Subsequently, the pixel position (x, y) that a specific quadcopter 16 is to assume may be uploaded wirelessly to the quadcopter. On its way back to the storage facility 24, each quadcopter 16 may be identified again and subsequently its designated cubicle 24a position (SRH) may be uploaded wirelessly to the quadcopter. Any quadcopter 16 may be deployed to any pixel or be parked at any cubicle 24a with anonymity, modularity, and uniformity.

Each quadcopter 16 may be powered by way of Lithium Polymer (LiPo) batteries. For LiPo battery maintenance for the plurality of quadcopters 16, each stack of three cubicles (24a, 24b, 24c, 24d) could be serviced (recharge & induced discharge) by one same battery charging station 26 that hooks onto a wired data bus reaching a central computer 14. Maintaining two thousand LiPo batteries may be a task that could benefit a great deal from robotics whereas manual maintenance increases operational costs and storage facility footprint. Not only is it preferable to solidly connect the outside battery charging station 26 to the main & balanced wires from a LiPo battery 21, but also the latter has to be disconnected altogether from its load, i.e., the quadcopter's circuitry, and be later reconnected.

The more the automated battery maintenance, the more streamlined the operation, the smaller the storage facility footprint, and the lower the operational costs. Given the large number of LiPo batteries 21 involved, it would be reasonable to have some fire extinguishing plumbing controlled by computer 14 reading from sensors scattered throughout the storage facility 24. Also, quadcopters 16 may be flown to a workshop area within the storage facility 24 for inspection. But if not robotized, battery maintenance may be a task able to be performed by trained personnel from an amusement park staff, if that is where display screen 12 is to be deployed. Also, with media now unrelated to content, designing and developing the latter, from entertainment to immediate ad-spots, is fully back in the hands of the amusement park staff as well, as it typically has been.

For audio sound one or more quadcopters 16 may each carry one small suitable speaker 22, and may wirelessly receive audio from the computer 14 on the ground. The method may therefore include providing an audio speaker 22 on one or more of the plurality of unmanned aerial vehicles 16 and playing an audio track through the audio speakers 22 of the one or more of the plurality of unmanned aerial vehicles 16. The audio track may include music, sound effects, and dialogue. Unlike video, sound cannot be broadcast to opposing audiences independently because of the likelihood of wind carrying the signal from one audience to the other. Stereo sound may easily be achieved by connecting each end-side of the screen 12 to one audio channel, i.e. left one thousand quadcopters broadcast the left audio channel. If need be (for the opposing screen 12) to compensate for mirror-stereo sound, the video content could be displayed in mirror-like orientation as well. If the noise of two thousand quadcopters 16 hovering overwhelms the viewer's experience or drowns the content's audio, it might be possible to use adaptive noise cancellation to address the challenge. Moreover, since the source of noise is well known (motors) it may be possible to bypass the need to continuously generate the cancelling signal and instead use one pre-programmed and stored onboard quadcopter 16, fine-tuning it to the current noise by shifting some phase reference as commanded from the ground (computer 14), altogether relaxing the demands on the onboard electronics.

In general terms the operation of this screen 12 could be divided in four major tasks: namely, displaying content; developing content—show & advertisement (ad-spots); storing the quadcopters 16 & maintaining the LiPo batteries used therewith; and deploying & retrieving the screen 12. Displaying content (audio-visual) may be no more challenging than connecting a desktop computer to an LED banner display, albeit wirelessly. Developing content for a low resolution display is in the hands of graphic designers and not a particularly challenging job. Deploying and retrieving the screen 12 is independent of content, even if different screen aspects are erected to fit specific content type such as long scrolling text banners. In traversing the halls and corridors of the storage facility 24, in from and out to a show, and in flying between storage and screen site, quadcopters 16 may engage in very modular and uniform flying, mostly single file in actions that repeat virtually unchanged for every show.

Erecting the screen 12 by flying each quadcopter 16 to its assigned pixel coordinates somewhat resembles the arriving at its assigned cubicle 24a at the end of a show as flight paths are similarly modular and repetitive, albeit with a more complex sensor fusion scheme given the difference in environments, i.e., open air versus close quarters in storage. While the quadcopters 16 get from launch to their own pixel position (or back to storage), the two onboard light elements 18 can be wirelessly accessed and controlled just as while the screen 12 is fully deployed, thus providing for extra light show time. It should be understood a cubicle position in a storage facility may be assigned to one or more of the plurality of unmanned aerial vehicles 16; a signal is wirelessly transmitted from the computer 14 to the one or more of the plurality of unmanned aerial vehicles; and the one or more of the plurality of unmanned aerial vehicles 16 moves (i.e., flies) to the assigned cubicle position in. In this instance, the signal may comprise the coordinates in the cubicle for the selected unmanned aerial vehicle 16. The cubicle position may be associated with a specific unmanned aerial vehicle 16 in one example but may be associated with any of the unmanned aerial vehicles 16 in other examples. In other words, any one of the plurality of unmanned aerial vehicles 16 may be moved to a specific cubicle in the storage facility. In other instances, a specific one of the plurality of unmanned aerial vehicles 16 may be moved to any one of a plurality of different cubicles in the storage facility.

Utilizing system 10 and method disclosed herein instantly enables the level of content to be displayed on the bidirectional screen 12 to skyrocket and it is possible for the screen 12 to become alive with exciting more complex imagery than ever before. The content may include animations moving with life-like speed, or faster! The content, such as text, may scroll freely accompanied by some added visual effects. The display screen 12 could be used for novel purposes such as displaying a live game of Tic-Tac-Toe, for example, between two winning-spectators within a viewing audience. Ad spots may be designed, developed, and aired just as one would for any other content on a .GIF file, for only one airing on a show and in an affordable manner. The content may be made immediately available in a menu provided on the computer 14.

A fitting site for a screen 12 made of hovering quadcopters 16 would be a location such as an amusement park. In this environment actual flying would likely be limited to launching from the storage facility 24 to the location where the screen 12 is erected aloft, deploying the screen 12 (pixels), and remaining hovering for the duration of the show. At show's end the quadcopters 16 may be returned to the storage facility 24 following in reverse, the same path back to the storage facility 24 that they took when being deployed. In this environment it is likely that the specific location chosen for the screen 12, the flight path from the storage facility 24 to the location or site for the deployed screen 12, and in general all instances of flying, be free of obstacles, and be repeatable routines flown every time the screen 12 is deployed.

All stages of flying are unrelated to content, consequently there is no need any more for complex flight developing for each and all individual quadcopters separately and dependently on content. The gain in immediacy is radical; the screen 12 is always ready for whatever is to be shown on it.

Content such as a game of Tic-Tac-Toe may be utilized in system 10. Furthermore, apps may be designed and developed once and then may be executed repeatedly. It may be possible to filter the captured video of a live speaker to make it suitable for the available resolution, or dynamically transformed into a preprogrammed cartoonish character that mimics the speaker.

In some embodiments, it may be possible to make the screen 12 acceptable for day viewing provided some suitable contrast is provided around the light elements 18 to make them more visible in daylight. However, even if only night shows are feasible, then the continuous availability of fresh new content and the potential for multiple unique ad-spots per show each day, would benefit from a screen 12 meant for daily work, weather permitting.

It will be understood that while the display screen has been described and illustrated herein as a vertically-oriented screen that has a first side and a second side because the display screen is created by positioning the plurality of unmanned aerial vehicles in the air; the display screen may be horizontally oriented above an audience. In this instance only one screen will be visible to the audience and they will need to look up to see the graphic information that is displayed on that screen. In yet other embodiments, the display screen may be oriented at an angle somewhere between horizontal and vertical and then the content displayed thereon will only be visible on one screen.

In other embodiments, instead of the display screen having only two sides that are simultaneously viewable, the unmanned aerial vehicles may be arranged in the air to form more complex shapes. For example, the unmanned aerial vehicles 16 may be configured into a triangular shape (i.e., having three vertically oriented "walls") in which case three screens are simultaneously viewable. The unmanned aerial vehicles 16 may be positioned in the air to form a square formation or an octagon or any irregular shape that includes generally curved "walls". A combination of orientations for the unmanned aerial vehicles may be adopted such as having a first plurality of unmanned aerial vehicles forming a generally vertically-oriented grid and a second plurality of unmanned aerial vehicles forming a generally horizontally-oriented grid that is adjacent the vertically-oriented grid to create an "L-shaped" display screen.

It should be noted that the system and method disclosed herein is directed to a system that separates media from content. In the method in accordance with the present disclosure, the content is displayed as a raster screen i.e., the image moves and the unmanned aerial vehicles 16 remain stationary. In every light show that has been undertaken prior to the present invention, the drones always move in one way or another at one pace or another but they always move and where they go ends up configuring the graphic image that is displayed in the air. Typically in these prior art light shows the drones will be still for a short while and lights on the drones may be switched on and off but the drones will be constantly moved to reshape the displayed image. In other words, in prior art uses of lighted drones for displaying images in the air, the image is formed and changed by rearranging the positions of the drones. In the present invention, however, the graphic image is not formed by positioning and repositioning the unmanned aerial vehicles in the air. In fact, in the present invention it is most desirable for the unmanned aerial vehicles to remain as still as possible in order to truly play the role of an anonymous pixel on the display screen so a raster of these "pixels" that repeats unchanged over and over again can display the image. The present system and method more closely approximate a television screen. The pixels on the TV screen do not move about. Even if the unmanned aerial vehicles include only one light element 18, the fact that the unmanned aerial vehicles 16 are moved into a specific position in the display screen and they remain in that location makes it possible for the graphic image to be displayed in a raster-type fashion on the display screen.

If the unmanned aerial vehicles 16 include one light element 18 or more than one light element 18, the method for the image display would still be completely different from the manner of utilizing drones for light displays that are currently known. Independently of how many light elements 18 each unmanned aerial vehicle 16 may carry, none of the vehicles 16 in the present system gets an individual flight path uploaded, the invention's unmanned aerial vehicles do not fly different paths at all. Instead, each of the unmanned aerial vehicles will hover in a single location in the pattern of unmanned aerial vehicles once deployed for the entire time that the graphic images are displayed on the display screen formed by the unmanned aerial vehicles. By contrast, in currently known light shows each drone is uploaded with a unique flight path to follow and the drones move around during the light show; the drones do not remain in their initial positions in the air. In the presently disclosed system every single unmanned aerial vehicle is anonymous and they all fly substantially the same path moving from the storage facility to the pattern, hovering in a specific location in the pattern until the show is over and then returning to the storage facility.

In the present disclosure, unlike the prior art, once all unmanned aerial vehicles have reached their unique pixel positions in the air, the screen they configure is ready to display what is sent wirelessly to it by the computer. Notwithstanding its low resolution (2,000 to 10,000 pixels), the screen is then essentially in no way different from a display monitor connected to a computer with the latter continuously executing a raster or scan pattern of the pixels in the monitor Consequently, the screen formed by the unmanned aerial vehicles in accordance with this disclosure is similar in nature to pixel based displays. In the present display screen, the unmanned aerial vehicles form anonymous pixels in the display screen and are not attached in any way to the graphic image being displayed on that screen.

Interestingly one thing makes a screen made of unmanned aerial vehicles unique vis-à-vis high resolution monitors and low resolution displays is that, in the latter two instances, the pixels are always firmly secured mechanically so they don't move around at all whereas a hovering display screen formed with a plurality of unmanned aerial vehicles is not firmly fixed in space. On the other hand, similarly to regular monitors, the content to be displayed on the display screen of this invention has no incidence on the pattern of pixels; the pattern is maintained. In some embodiments the display screen is formed by the plurality of unmanned aerial vehicles forming a pattern that is generally rectangular with the unmanned aerial vehicles being positioned in a grid of rows and columns. In this particular instance the unmanned aerial vehicles will maintain their position in this grid-pattern. However, in other embodiments, the display screen will be of a different overall shape and the unmanned aerial vehicles will be positioned in the air so as to form that different shape and will stay in that same formation or configuration during display of content on the display screen.

The display screen in accordance with the present disclosure has no content or other connection whatsoever to the flight path that the unmanned aerial vehicles follow fly from their storage facility to pixel formation (i.e., their arrangement as part of a display screen in the air). The flight path is essentially the same for every unmanned aerial vehicle in the display screen except for the particular position each vehicle takes up in the screen. Additionally, the flight path would most likely remain unchanged throughout the many times the display screen is deployed to display many and varied content.

In contrast with the prior art, the pixel-based-display-screen configured by a multiplicity (i.e., around 2,000) of hovering unmanned aerial vehicles can easily display scrolling text just as real life speed motion because the light spot representing a piece of the anatomy of a particular graphic image is passed from one vehicle to the other while the vehicles themselves all remain substantially motionless in the air. The individual vehicles do not move, instead the lights on various copters are switched on and off appropriately and this may occur substantially instantaneously. The light elements of all unmanned aerial vehicles that form the graphic image are illuminated and all other light elements remain unlit and the associated vehicles remain in the pattern. The switching on and off at the appropriate times of the pixel or light elements on the unmanned aerial vehicles can effectively convey the impression of movement to the viewer. And notwithstanding the low resolution structural to the invention when compared to a high resolution TV, the fact is that the graphic image would appear to move in real-life fashion. Although not illustrated herein, the nature of the invention makes it very simple to enhance a graphic image making it fuller and more lifelike by using many more than a basic number of drones that would be necessary to create a basic graphic image. Additional drones may be used to add surroundings to an image. For example, a basic number of drones may be used to depict an image of a predator chasing prey at real-life speeds but the graphic image may be enhanced by including additional drones that depict the natural environment surrounding the predator.

Scrolling text and cool effects are a given in a pixel based display screen environment. With the technique as suggested by the invention the focus for better shows is not a better flying copter but more compelling and fully motion animated imagery.

An evident requirement of the nature of the technique as suggested by the invention is keeping the plurality of unmanned aerial vehicles (pixels) in formation in the pattern as motionless as possible. It is contemplated that it is technically more feasible, and practical, and cheaper, to achieve an almost motionless hover of a large number of unmanned aerial vehicles in very close formation, than getting those vehicles to move about through individual complicated flight paths with such fluidity, sharpness and speed, to credibly represent any part of an animal for instance. In this invention the level of the ability of the unmanned aerial vehicles to fly is actually irrelevant as long as they can get to their pixel position and then hover still, in formation, from then on. Although the screen of this invention may be repositioned once already deployed it would not be by a considerable distance in all likelihood.

As a consequence, in the present invention just as content does not influence the unmanned aerial vehicle flight paths, the vehicle's flight limitations do not substantially limit content, i.e. an animal can run in a speed that approximates real life; characters can be shown speaking or throwing a ball, dice can roll and bounce convincingly and text can scroll or fade in and out as fast as required. A limit to the content that the screen of the invention can display may be due to issues of resolution rather than the ability of the unmanned aerial vehicles to fly complex patterns with great accuracy and responsiveness, which is unnecessary in the context of the invention.

As long as a graphic designer is aware of the resolution of the screen produced by the unmanned aerial vehicles, that designer could come up with the complete animation, possibly in GIF file format, including sound if desired and send the file to the computer without having the faintest idea that the screen the content is for is one made of unmanned aerial vehicles because now media and content are no longer connected. As a matter of fact any existing GIF and JPEG file and the like could be filtered with ordinary utility software to be adapted to play in the lower resolution of the screen of the invention, and be faithful enough to the original if the original content lends itself to the exercise, if it does not degrade beyond acceptable. This also speaks of the unprecedented, in the context of unmanned aerial vehicles, immediacy from content design to show time made available by the separation of content from the display media.

In the presently disclosed system, if the face of a person is captured by video camera and the resulting signal appropriately reduced to the screen's resolution (2k-8k-10k pixels) it could go on air live, or be dynamically transformed into a preprogrammed character that mimics the speaker on the screen. Or the throw of the dice on a table could be captured on video and shown live on the screen aloft, with bouncing black dots and all with the resulting number making someone in the audience win the opportunity to play with an app on his cellular phone an interactive game of Tic-Tac-Toe with the screen, where the marks the player makes on his cell instantly appear on the screen for everyone to see. An instance of the ultimate immediacy could be the warning alert message interrupting the ongoing show to display a lost child alert; text could go from the keyboard on the computer straight to the screen aloft.

A light show that needed a matter of days to be developed for the prior art system can, with the 2D Pixel-Based Screen as described in this disclosure be ready in seconds if the file already exists, where it would be just a matter of processing it with software to adapt it to the resolution of the display screen and the image would then be ready for immediate displaying. If the content is new and needs to be created from scratch, that would take no longer than the creation of the same show if it were to be displayed on a regular laptop's monitor. In the present system, as stated before, content control passes back to regular content designers with no knowledge or skills on unmanned aerial vehicle issues, a very good thing for entertainment parks that don't want to be in the drone flight management business but in the content and marketing business.

An interesting benefit of the screen system disclosed herein is that a failing unmanned aerial vehicle could easily and immediately be replaced with a spare one, with no risk of collision between both the departing and its replacement copter with any of the other copters deployed. Also, any unmanned aerial vehicle may be assigned to any pixel with equally minimum effort In contrast, in previously known systems, leaving or arriving drones mid-show have to negotiate the mine field of other copters already scattered in space. With no immediacy capabilities available with the previously known systems, there would be no time to design and develop a flight path for a spare drone to take over the current position of the faulty one; the faulty drone would most likely not be replaced and therefore the overall displayed image may be damaged.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system for displaying dynamic graphic content such as moving text or moving images, said system comprising:
   a static display screen; and
   a computer programmed to display the dynamic graphic content on the static display screen; and wherein the static display screen comprises:
      a plurality of unmanned aerial vehicles deployed and hovering in a static pattern in the air and thereby forming the static display screen; wherein each of the plurality of unmanned aerial vehicles includes at least one light element which forms a pixel of the static display screen; and wherein the dynamic graphic content to be displayed is transmitted by the computer to the plurality of unmanned aerial vehicles; and while the plurality of unmanned aerial vehicles remain substantially motionless in the static display screen, the transmitted dynamic graphic content is displayed by the pixels of the static display screen.

2. The system as defined in claim 1, wherein the pattern is a fixed pattern of the plurality of unmanned aerial vehicles, and the fixed pattern includes that the plurality of unmanned aerial vehicles are positioned at repetitive intervals from each other and the at least one light element on the one or more of the plurality of unmanned aerial vehicles are uniformly scattered in the display screen.

3. The system as defined in claim 1, wherein the pattern of the plurality of unmanned aerial vehicles forms a substantially flat display screen.

4. The system as defined in claim 1, wherein the plurality of unmanned aerial vehicles is a plurality of quadcopters.

5. The system as defined in claim 4, wherein the at least one light element comprises a pair of light elements mounted on opposite sides of each of the plurality of quadcopters.

6. The system as defined in claim 5, wherein each light element of the pair of light elements is selectively individually illuminated by the computer; and wherein a first light element of the pair of light elements forms a pixel on a first side of the display screen; and wherein a second light element of the pair of light elements forms a second pixel on a second side of the display screen; and the display screen formed by the plurality of unmanned aerial vehicles is a double-sided display screen having a first screen on the first side and a second screen on the second side.

7. The system as defined in claim 6, wherein the first screen and the second screen on the double-sided display screen are independent of each other.

8. The system as defined in claim 1, further comprising:
   a sensor located on one or more of the plurality of unmanned aerial vehicles; wherein the sensor is operatively engaged with the computer and provides information relating to a coordinate position of the associated one of the plurality of unmanned aerial vehicles in the display screen.

9. The system as defined in claim 1, further comprising an audio speaker provided on one or more of the plurality of unmanned aerial vehicles.

10. The system as defined in claim 1, further comprising a storage facility including a plurality of cubicles, wherein each of the plurality of unmanned aerial vehicles is configured to be received inside one of the plurality of cubicles.

11. A method of displaying graphic information comprising:
    deploying a plurality of unmanned aerial vehicles;
    arranging the deployed plurality of unmanned aerial vehicles into a grid pattern in the air, wherein the grid pattern is static and is substantially fixed in the air;
    keeping the plurality of unmanned aerial vehicles substantially motionless while in the static grid pattern;
    wirelessly linking the plurality of unmanned aerial vehicles to a computer;
    wirelessly transmitting signals from the computer to the unmanned aerial vehicles;
    selectively illuminating a light element on one or more of the plurality of unmanned aerial vehicles; and
    creating a dynamic first graphic image on the static grid pattern utilizing the illuminated light element of the one or more of the plurality of unmanned aerial vehicles.

12. The method as defined in claim 11, further comprising configuring the grid pattern into a substantially flat display screen.

13. The method as defined in claim 12, further comprising orienting the grid pattern vertically in the air, wherein the display screen is vertically-oriented in the air.

14. The method as defined in claim 13, further comprising:
    viewing the dynamic first graphic image from the ground a distance away from a first side of the display screen.

15. The method as defined in claim 14, further comprising:
    illuminating a second light element on the one or more of the plurality of unmanned aerial vehicles, wherein the first light element is on a first side of each of the one or more of the plurality of unmanned aerial vehicles and the second light element is on a second side of each of the one or more of the plurality of unmanned aerial vehicles;
    creating a dynamic second graphic image on a second side of the display screen with the second light element provided on the one or more of the plurality of unmanned aerial vehicles; and viewing the second graphic image from the ground a distance away from the second side of the display screen.

16. The method as defined in claim 15, further comprising simultaneously creating the first graphic image and the second graphic image.

17. The method as defined in claim 16, wherein the creating of the first graphic image includes rolling text or images across the first side of the display screen; and the creating of the second graphic image includes rolling text or images across the second side of the display screen; and wherein the rolling of text or images across the first side of the display screen occurs in a direction opposite to the rolling of text or images across the second side of the display screen.

18. The method as defined in claim 11, further comprising:
providing a sensor on the one or more of the plurality of unmanned aerial vehicles; and
determining, with the computer, a position of the one or more of the plurality of unmanned aerial vehicles using data provided by the sensor.

19. The method as defined in claim 11, further comprising:
providing an audio speaker on the one or more of the plurality of unmanned aerial vehicles; and
playing an audio track utilizing the audio speaker on the one or more of the plurality of unmanned aerial vehicles.

20. The method as defined in claim 11, further comprising:
assigning a pixel position in the grid pattern for one or more of the plurality of unmanned aerial vehicles;
wirelessly transmitting a signal from the computer to the one or more of the plurality of unmanned aerial vehicles; and
moving the one or more of the plurality of unmanned aerial vehicles to the assigned pixel position in the grid pattern.

21. The method as defined in claim 11, further comprising deploying the plurality of unmanned aerial vehicles from a storage facility.

22. The method as defined in claim 11, further comprising:
moving the plurality of unmanned aerial vehicles from the grid pattern to a storage facility;
parking each of the one or more of the plurality of unmanned aerial vehicles in a cubicle within the storage facility.

23. The method as defined claim 22, further comprising charging a battery of each of the one or more of the plurality of unmanned aerial vehicles while parked in the cubicle in the storage facility.

24. The method as defined in claim 22, further comprising:
assigning the cubicle for each of the one or more of the plurality of unmanned aerial vehicles;
wirelessly transmitting a signal from the computer to each of the one or more of the plurality of unmanned aerial vehicles; and
moving each of the one or more of the plurality of unmanned aerial vehicles to the assigned cubicle.

25. A system for displaying graphic content in the air, said system comprising:
a display screen that is double-sided; and
a computer programmed to display static and dynamic graphic content on the display screen; wherein the display screen comprises a plurality of unmanned aerial vehicles deployed and hovering in a fixed pattern in the air such that the display screen is a static display screen; wherein each of the plurality of unmanned aerial vehicles includes at least one light element at one or both of two opposing regions of a body of the unmanned aerial vehicle; wherein the at least one light element forms a pixel on a first side of the static display screen or on a second side of the static display screen; and wherein the computer selectively illuminates the at least one light element on the one or both of the first and second sides of the static display screen and thereby displays static and dynamic graphic content on the one or both of the first side and the second side of the static display screen.

26. The system as defined in claim 1, wherein each of the plurality of unmanned aerial vehicles is assigned a set location within the static display screen and remains in the set location while the dynamic graphic content is displayed on the static display screen, and wherein the set location of each of the plurality of unmanned aerial vehicles is independent of the dynamic graphic content being displayed.

* * * * *